Sept. 12, 1967  G. R. ANDERSON  3,340,994
SINGLE ARTICLE FEEDER
Filed Oct. 20, 1965  4 Sheets-Sheet 1
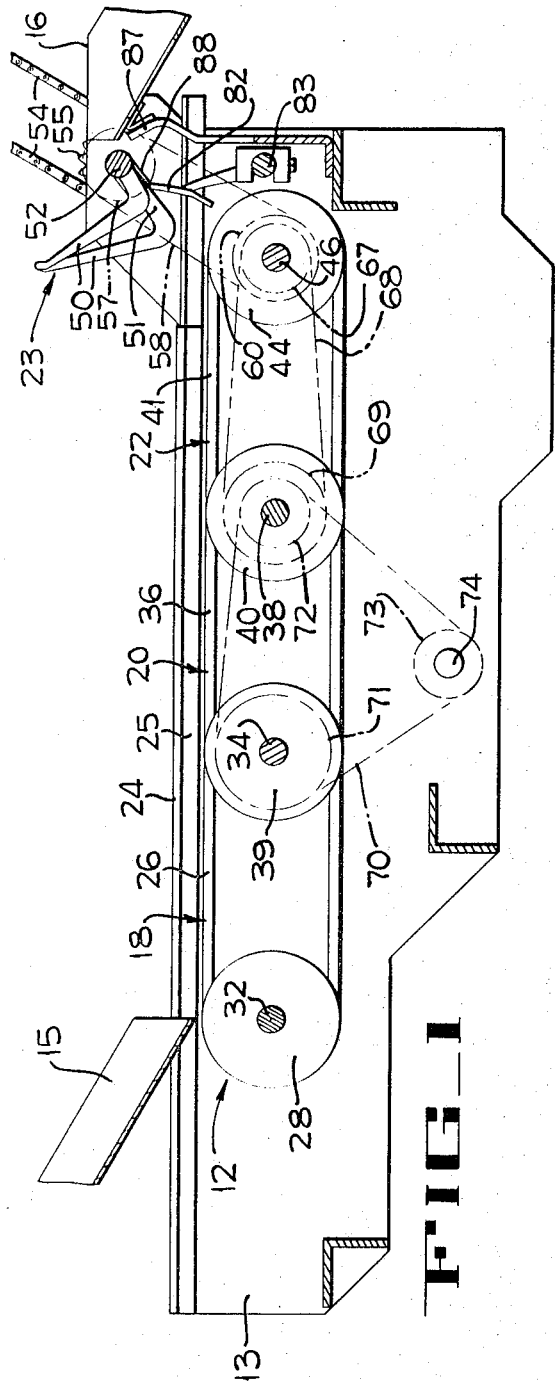
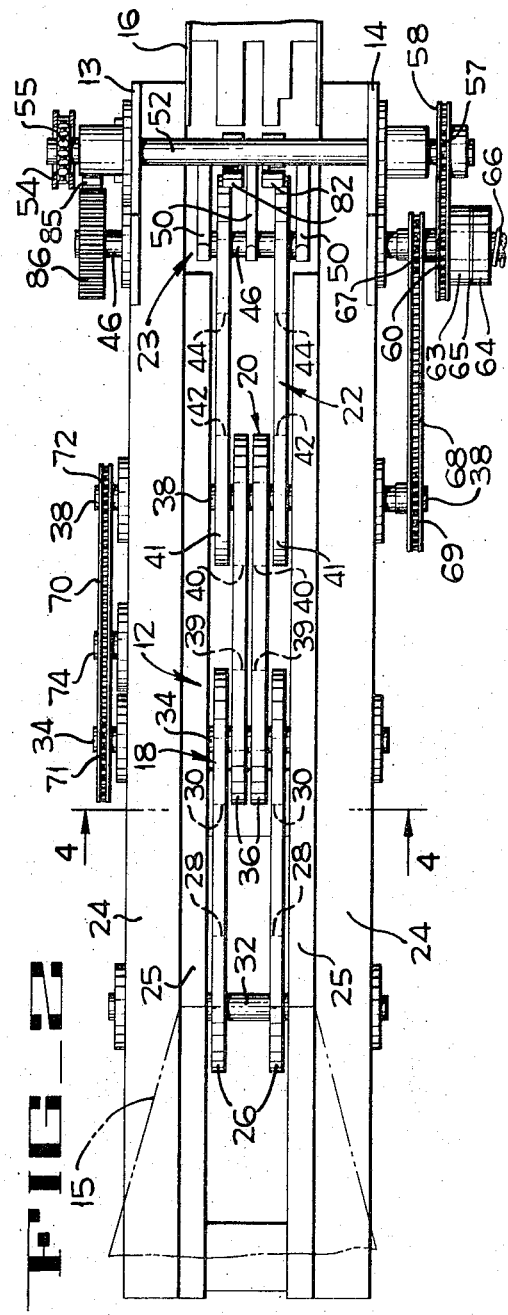
INVENTOR
GERALD R. ANDERSON
BY Hans G. Hoffmeister
ATTORNEY

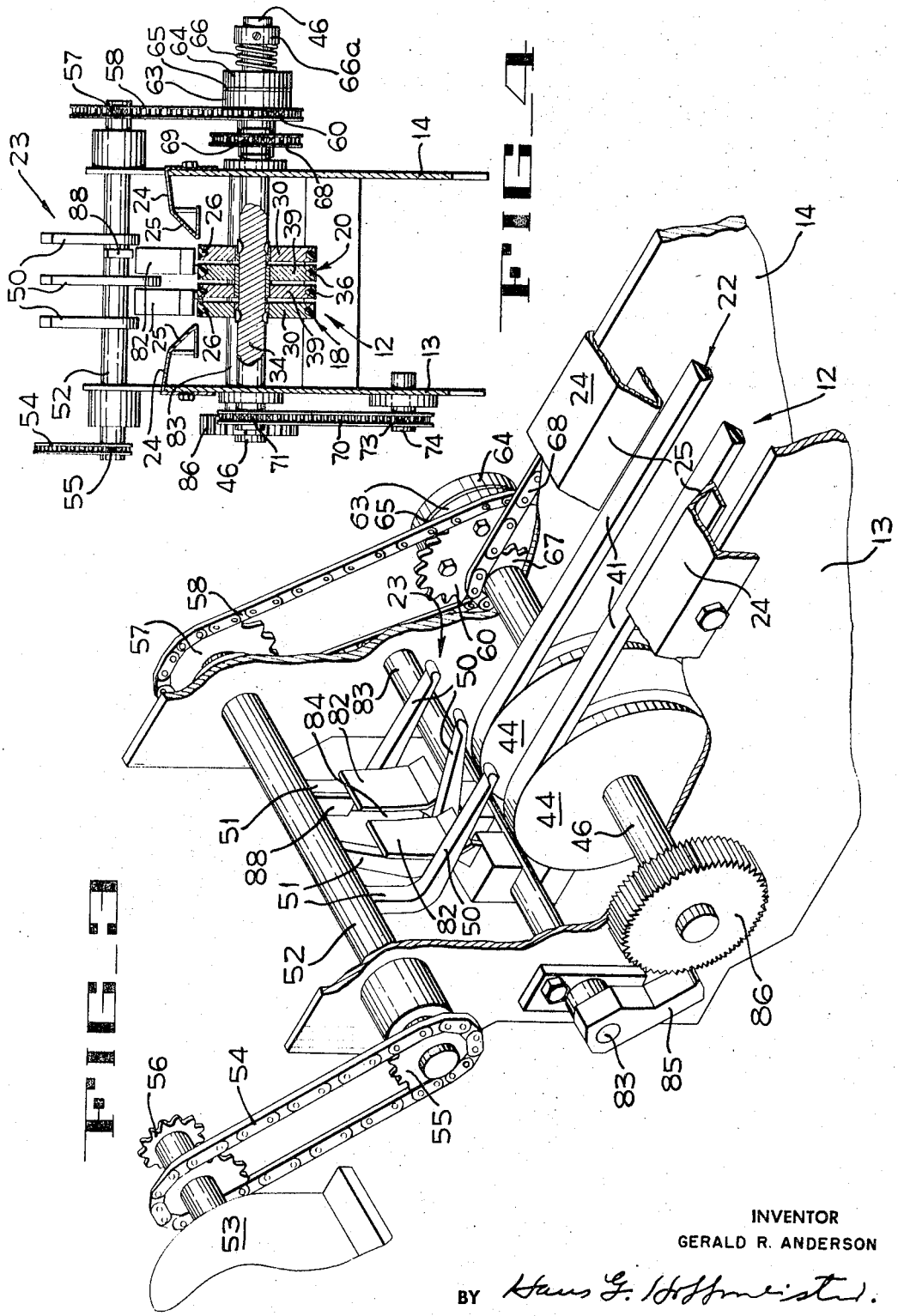

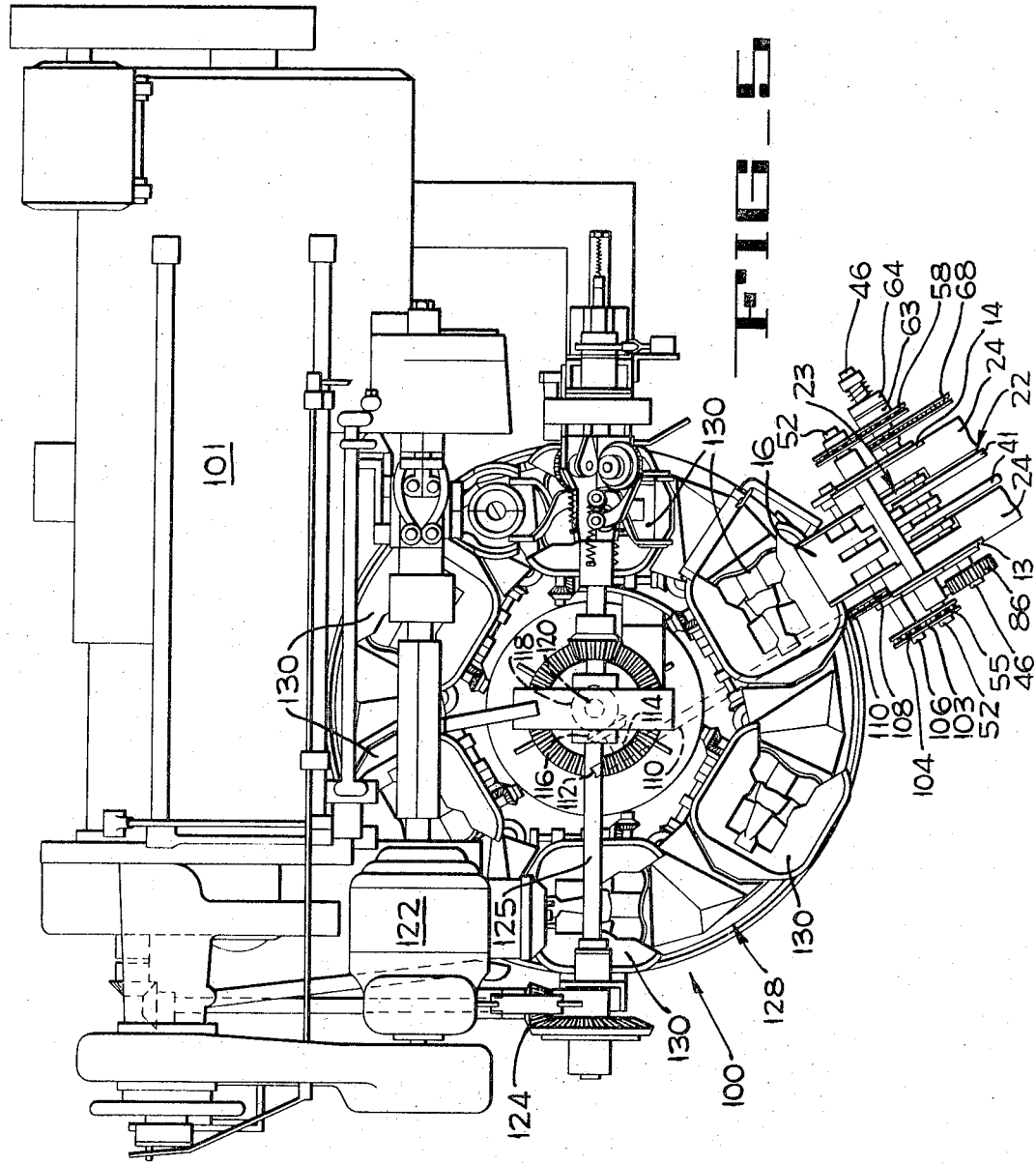

Sept. 12, 1967  G. R. ANDERSON  3,340,994
SINGLE ARTICLE FEEDER
Filed Oct. 20, 1965  4 Sheets-Sheet 4
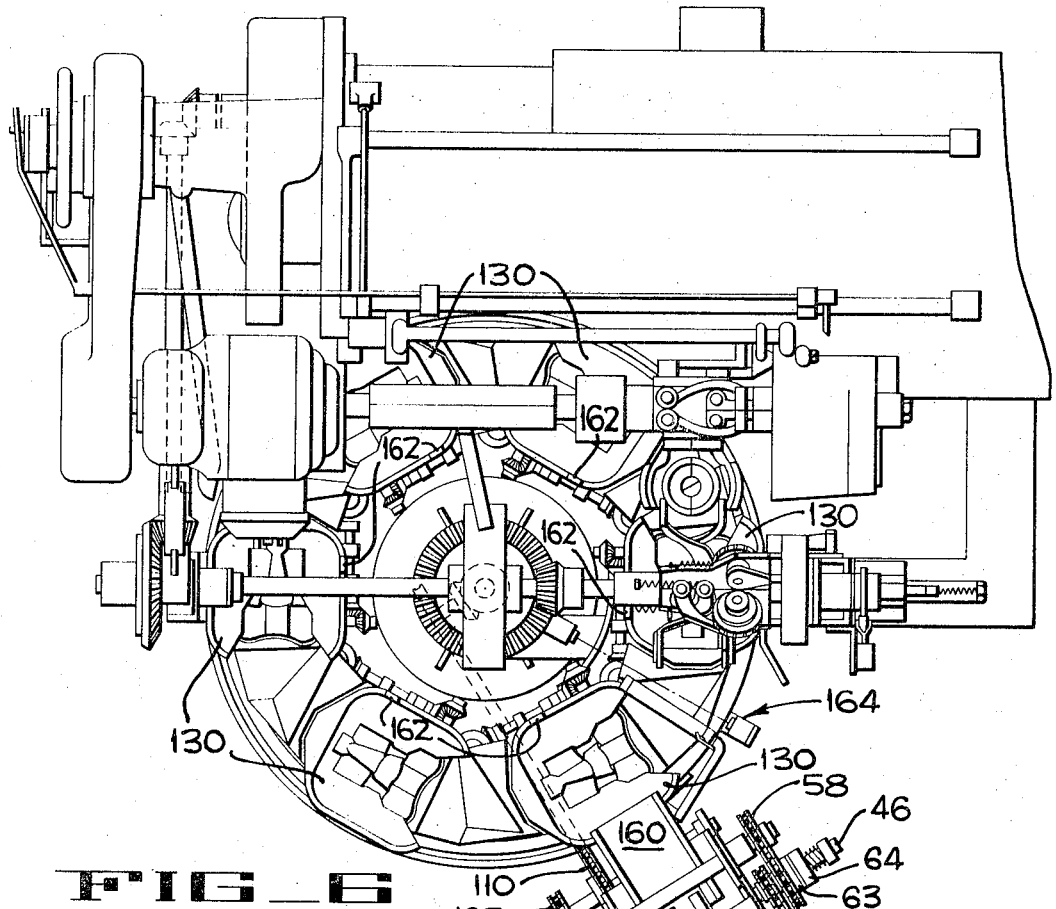
FIG_6
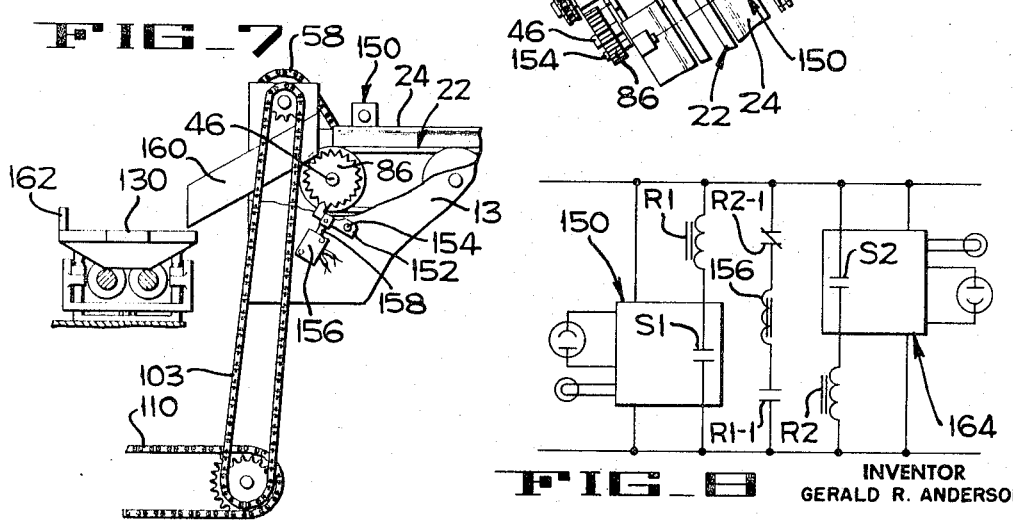
FIG_7
FIG_8
INVENTOR
GERALD R. ANDERSON
BY Hans G. Hoffmeister
ATTORNEY

United States Patent Office 3,340,994
Patented Sept. 12, 1967

3,340,994
SINGLE ARTICLE FEEDER
Gerald R. Anderson, Campbell, Calif., assignor to FMC Corporation, San Jose, Calif., a corporation of Delaware
Filed Oct. 20, 1965, Ser. No. 498,748
13 Claims. (Cl. 198—34)

ABSTRACT OF THE DISCLOSURE

A pear singulating and feeding unit for a pear peeler comprising a multi-stage, troughlike V-belt conveyor, single article transfer fingers between the conveyor belts, an article operated clutch for the conveyor, and a chute for receiving articles from the transfer fingers.

---

The present invention relates to an apparatus for feeding single articles, and more particularly to a single article feeder for receiving a random supply of articles, progressively increasing the distance between the articles while moving the articles in single file, and individually discharging the articles in timed relation.

In fruit processing machinery, and other article handling machinery, it is often necessary to transfer articles one by one from a random supply of articles so that subsequent operations may be performed on each article. In high speed processing equipment the transfer must be done quickly and without excessive manipulation.

The present invention will be described as particularly applied to a fruit processing system, although it will be readily appreciated that the present apparatus has a wider utility than that disclosed in this specific application and can be used whenever a large number of articles are to be transferred individually.

It is an object of this invention to provide an improved apparatus for separating a single article from a random supply of articles and transferring the article to a receiving mechanism.

Another object is to form a single row of articles from a random supply of articles.

Another object of this invention is to provide a machine for forming a single row of articles having a progressively increasing distance between the articles and for maintaining this distance when an article is being individually transferred to another mechanism.

Other objects and advantages of the present invention will become apparent from the following description and the accompanying drawings, in which:

FIGURE 1 is a vertical central section, with certain parts broken away, or the single article feeder of the present invention.

FIGURE 2 is a top plan of the feeder of FIGURE 1 with the feed chute being shown in phantom.

FIGURE 3 is an enlarged diagrammatic perspective of the individual article transfer mechanism and associated parts, with certain other parts broken away, and with the pick-up fingers shown in a different operative position from that of FIGURE 1.

FIGURE 4 is a vertical section taken along lines 4—4 of FIGURE 2, with certain parts broken away.

FIGURE 5 is a diagrammatic plan showing the feeder of FIGURES 1-4 operatively associated with a mechanism for delivering pears to a pear processing machine, and particularly showing the drive means whereby the feeder is driven from said mechanism and in timed relation therewith.

FIGURE 6 is a diagrammatic plan showing a modified form of the feeder operatively associated with a mechanism for delivering pears to a processing machine, particularly showing an arrangement which is operated in timed relation with the mechanism.

FIGURE 7 is a diagrammatic fragmentary side elevation of the apparatus shown in FIGURE 6 with parts broken away.

FIGURE 8 is a schematic wiring diagram employed with the embodiment shown in FIGURE 6.

The embodiment of the single article feeder chosen for illustration of the present invention comprises a conveyor system 12 (FIGS. 1 and 2) mounted on a pair of stationary, rigid side plates 13 and 14 between a feed chute 15 and a slotted discharge chute 16.

The conveyor system 12 includes a series of overlapping endless belt conveyors, each conveyor moving at a different speed. The feed chute 15 deposits fruit such as pears onto the first and slowest moving conveyor 18. An intermediate conveyor 20 moving at a greater speed receives fruit from conveyor 18 and increases the spacing between adjacent fruit. The greatest separation between the fruit occurs on the last and fastest moving conveyor 22.

It should be noted that the order in which the relative speeds of the individual conveyors are varied or the number of conveyors used in the system is immaterial so long as the spaced articles are presented to an article transfer mechanism 23 in spaced relation and in a single row.

Two transversely spaced, guide members 24 (FIGS. 2 and 3) extend longitudinally along opposite sides of the three conveyors 18, 20 and 22 and include inclined walls 25 (FIG. 4) which define an open bottomed trough for urging the conveyed fruit into a single row.

Each of the belt conveyors comprises a pair of transversely spaced, endless V-belts supported by pulleys on rotating shafts. More specifically, the slow speed conveyor 18 has its belts 26 supported on pairs of pulleys 28 and 30 respectively carried on shafts 32 and 34 that are journalled for rotation in the side plates 13 and 14. The pulleys 30 are keyed to and are driven by shaft 34, and pulleys 28 act as idlers and are secured to the shaft 32. The intermediate conveyor 20 includes transversely spaced V-belts 36 which are supported on shafts 34 and 38 (FIGS. 1 and 2) by pairs of pulleys, 39 and 40. The two pulleys 39 are journalled for rotation on shaft 34 and the two pulleys 40 are keyed to shaft 38 so that rotation of the shaft 38 drives the belts 36. The last or high speed conveyor 22 includes two V-belts 41, which are supported on pairs of pulleys 42 and 44, and are spaced transversely the same distance as the belts 26 of the first conveyor 18. The pulleys 44 are keyed to and driven by a drive shaft 46, and the idler pulleys 42 are freely journalled on the shaft 38.

The article transfer mechanism 23 (FIGS. 1 and 3) is located at a transfer station adjacent the pulleys 44 at the discharge end of the high speed conveyor 22. The mechanism 23 transfers fruit, one at a time, in timed relation with the movement of a receiving mechanism such as continuously driven fruit orienting mechanisms of the type disclosed in United States Patent No. 3,137,383 to D. W. Chamberlin.

The mechanism 23 comprises three axially spaced hook-shaped pick-up fingers 50 having mounting legs 51 secured to and extending outwardly in a radial direction from a rotatable shaft 52. The shaft 52 is rotatably driven by any suitable power means such as a motor 53, shown generally in FIGURE 3, through an endless chain drive 54 which includes a sprocket 55 keyed to the shaft 52. As mentioned above, the shaft 52 rotates in timed relation with the moving parts of a receiving mechanism (not shown) which mechanism may be driven by a sprocket 56 on the drive shaft of motor 53 as by a chain and sprocket drive.

On the opposite end of the shaft 52 is keyed another sprocket 57. A chain 58 is trained around this sprocket and around a sprocket 60 which is secured, as by capscrews, to a drive disc 63 (FIG. 4), said sprocket and drive disc being freely rotatable on the shaft 46. The disc 63 is one part of a slip clutch that includes a disc 64 that is keyed by a spline to the shaft 46. A friction facing or plate 65 of brake band material or the like is riveted or bonded to the disc 64, and a spring 66, which is disposed between a collar 66a on the shaft 46 and the disc 64, urges the disc 64 toward the disc 63 so that the plate 65 is normally in frictional driving engagement with disc 63.

The shaft 46 is drivingly connected to the shaft 38 by a chain 68 (FIG. 2) trained over a sprocket 67 keyed to the shaft 46 and over a sprocket 69 keyed to the shaft 38. The shaft 38 is likewise drivingly connected to the shaft 34 by a chain 70 which is trained around the sprockets 71 and 72 keyed to the shafts 34 and 38, respectively, and around a take-up sprocket 73 (FIG. 1) journalled on a shaft 74 to provide for adjustment of the chain. As will be seen in FIGURE 1 the size of the sprockets 67, 69, 71 and 72 are so coordinated that the shaft 34 is driven at a rotary speed that is less than the speed of the shaft 38 which is, in turn, driven at a speed less than the speed of the shaft 46.

To prevent two or more articles being transferred together two detector fingers 82 (FIG 3) are secured to a rock shaft 83 which is mounted for limited oscillatory movement and projects upwardly above the upper run of the belts 41 adjacent the discharge end thereof. The fingers 82 are spaced to define a slot 84 therebetween to permit passage of the centermost of the pick-up fingers 50. A positive clutch is provided which overrides the slip clutch 63, 64 and stops the feed belts while articles are being lifted by the fingers 50. A clutch dog or pawl 85 is secured to the shaft 83 in a position to be moved into engagement with a notched clutch wheel 86 keyed to the drive shaft 46. Two spaced, upwardly projecting fingers 87 (FIGS. 1 and 2) are mounted on the frame at the discharge end of the machine and support the slotted chute 16. The hook-shaped pick-up fingers 50 move through the slotted chute and any debris on the pick-up fingers 50 is stripped therefrom by the chute after the fruit is released.

When a single separated article, such as a pear, engages the upward projections of one or both of the detector fingers 82, the finger will be swung rearwardly, rotating shaft 83 counterclockwise (FIG. 3) and moving the pawl 85 into engagement with the notched wheel 86. Since the shaft 46 is driven from motor 53 through the slip clutch, the engagement of the pawl in the notched wheel will stop the rotation of shaft 46 and the conveyors 18, 20 and 22 will stop. The hook-shaped pick-up fingers 50 secured to the continuously rotatable shaft 52 then lift the pear from the conveyor 22 and transfer it to the discharge chute 16. Shortly after the pear is lifted from the conveyor 22, the detector fingers 82 are returned to their forward article-receiving position, as seen in FIGURE 1, by a cam lug 88, that is secured to and projects radially outward from the shaft 52, to positively release the pawl 85 from the notched wheel 86.

The release of the dog 85 by the lug 88 permits driving engagement of the friction plate 65 of the slip clutch and once more the movement of the three conveyors 18, 20 and 22 is started to repeat the cycle. Thus, the next separated pear will be moved into engagement with the detector fingers 82 for subsequent transfer by the continuously rotatable pick-up fingers 50 into the chute 16.

In operation, the motor 53 is started, thereby causing the upper runs of the conveyors 18, 20 and 22 to move toward the right and causing the transfer mechanism 23 to rotate at a constant speed and a clockwise direction as viewed in FIGURES 1 and 2. A random supply of pears in single file gravitate down the chute 15 onto the conveyor 18 which advances the pears to the conveyors 20 and 22. Since the conveyors 20 and 22 are driven at progressively greater speeds, the pears will become spaced prior to reaching the discharge end of the high speed conveyor 22 and prior to contacting and pivoting the fingers 82 in a clockwise direction. Clockwise pivotal movement of the fingers 82 causes the pawl 85 to engage the notched wheel 86, thereby stopping the conveyors until the pick-up fingers 50 have lifted the foremost pear from the conveyor 22. The cam lug 88 then engages the fingers 82 and withdraws the pawl 85 from the wheel 86, causing the conveyors 18, 20 and 22 to again be driven through the slip clutch. Upon continued rotation of the shaft 52, the singulated fruit is discharged from the fingers 50 and falls into the discharge chute 16 in proper timed relationship with certain movable portions of an article receiving mechanism (not shown). The above cycle of operation is then repeated for each fruit in turn.

It will be noted that, in FIGURE 1 the chute 15 is used to accumulate articles so that the feed mechanism of the present invention will have an adequate supply. It is within the scope of this invention to use a conveyor belt or the like instead of chute 15. Such a belt would be driven from shaft 38 by a chain at a faster linear speed than the belts of conveyor 18 are driven. Accordingly, articles will be accumulated on the conveyor 18. In another arrangement, the conveyor 18 could be driven at a faster speed than the conveyor 20 so that articles would accumulate on conveyor 20.

From the foregoing description it is apparent that the single article feeder of the present invention includes a series of conveyors which receive articles at random and move the articles in single file into a transfer station while spacing the articles from each other. The foremost article then contacts detecting fingers which terminates movement of the conveyors until pick-up fingers which are rotating at a predetermined constant speed lift the foremost article from the transfer station and discharge it into the discharge chute.

In the embodiment of the invention shown in FIGURE 5, the article feeder is shown drivingly connected to an aligning and feed mechanism 100 that delivers pears to a fruit preparation machine 101 of the type described in the aforementioned Chamberlin Patent No. 3,137,383. In this form of the invention, an endless chain 103 is trained around the sprocket 55 that is keyed on the shaft 52 and around a sprocket 104 which is keyed on an intermediate shaft 106 which is rotatably supported on forward extensions of the side plates 13 and 14 by any suitable well known means. An intermediate sprocket 108 is also keyed to the shaft 106. An endless chain 110 is trained around the sprocket 108 and around a drive sprocket 112, shown in dotted lines, which is keyed on a horizontal rotatable shaft 114 mounted on the frame of the fruit preparation machine. Keyed on the other end of the shaft 114 is a bevel gear 116 which is drivingly engaged with a second bevel gear 118 keyed on the main vertical shaft 120 of the machine disclosed in the Chamberlin patent.

A detailed description of the Chamberlin patent is not believed necessary and details of the fruit preparation machine may be had by referring to that patent which is included by reference in the present specification. For the purpose of the instant application a general description should suffice. In the feed and orienting mechanism 100, the vertical shaft 120 is driven by a motor 122 through a bever gear drive 124 and a shaft 125. Accordingly, the motor 122 drives the rotary shaft 52 of the article transfer mechanism 23 of the instant application through the chains 103 and 110 and the sprockets 55, 104, 108, and 112.

The orienting mechanism includes a turret 128 keyed to shaft 120 and six individual orienting mechanisms 130 of the fruit preparation machine. Thus, the shaft 52 and consequently the fingers 50 of the article transfer mechanism 23 are rotated in timed relation with the turret 128 and is arranged to deposit a single fruit in each of the individual orienting mechanisms 130. The result is an effective driving arrangement wherein the transfer mechanism 23 operates in timed relationship with the subsequent orienting mechanism of the fruit preparation machine.

In the form of the invention shown in FIGURES 6, 7 and 8, the hook-shaped, pick-up fingers and the detector fingers with their associated structure have been replaced by an electro-mechanical system. Except where indicated, the structure shown in FIGURES 6–8 is identical to that already described in the embodiment shown in FIGURE 5. As was previously mentioned, an important aspect of this invention is transferring the pears in timed relation with the subsequent operation of the processing machine. This feature will be more clearly emphasized by the hereinafter described apparatus.

A position indicator, such as a conventional electric eye unit 150, the details of which form no part of this invention, is mounted on the guide members 24 which extend longitudinally along opposite sides of the conveyor 22. A clutch dog or pawl 152 is pivotally mounted on a pin 154 which is securely fastened to the side wall 13. A solenoid 156 is also securely fastened to the side wall 13 and is provided with an actuating arm 158 which is pivotally connected to the pawl 152 by any suitable means. The actuating arm is internally biased by mechanism in the solenoid to a position with the pawl disengaged from the cog 86 mounted on the shaft 46. As in the embodiment of FIGURE 5, when the clutch dog or pawl is disengaged the conveyor 22 is rotated by virtue of the chains 110, 103, and 58 acting through the slip clutch defined by the discs 63 and 64.

A chute 160 is mounted at the discharge end of the conveyor 22 to receive a pear carried thereby and guides it into a receptacle or individual orienting mechanism 130. The individual orienting mechanism 130 is part of the fruit preparation machine earlier described in conjunction with FIGURE 5 and the details of the machine may be had by referring to the above-mentioned Chamberlin patent. In this embodiment, however, the individual orienting mechanisms are each provided with an upstanding tab 162 which is designed to break the beam of a second conventional electric eye unit 164 mounted on the fruit preparation machine. The electric eye unit 164 is positioned in a counterclockwise direction a predetermined distance from the chute 160 such that when a tab 162 breaks the beam in the electric eye unit 164, the individual orienting mechanism associated with that tab is just approaching the chute 160 but is still a predetermined distance from the chute.

The operation of the embodiment shown in FIGURES 6, 7 and 8 will best be described by referring to the circuit diagram shown in FIGURE 8. A pear carried by the conveyor 22 will approach the discharge end of the conveyor and upon reaching the transfer station adjacent the electric eye unit 150 will break the beam of the electric eye closing the normally open contacts S1, i.e., contacts which are open when the beam is uninterrupted, located in the electric eye unit 150 to enable current to energize a relay R1. Energization of the relay R1 closes normally open contacts R1–1 which permits line current to pass through the solenoid 156 and normally closed contacts R2–1. Energization of the solenoid forces the actuator arm 158 outwardly against its internal spring bias and forces the pawl 152 into engagement with the cog 86. As in the previous embodiments, the engagement of the cog with the pawl stops the drive to the conveyor 22 and the upstream conveyors 18 and 20 by virtue of the disc 64 slipping. Thus a pear is caused to rest at the discharge end of the conveyor 22. By stopping the conveyors upstream of the conveyor 22 only a single pear may be received at the transfer station at the discharge end of the conveyor. As the tab 162 on the next approaching individual orienting mechanism 130 breaks the beam in the electric eye unit 164, the switch S2 in the electric eye unit, which is also normally open when the beam is uninterrupted, is closed to energize a relay R2 which in turn opens contacts R2–1 to de-energize the solenoid 156. With the solenoid de-energized, the internal bias retracts the actuator arm 158 to disengage the pawl and restart the movement of the conveyors. The electric eye unit 164 is positioned to have its beam broken by the tab 162 of the next approaching individual orienting mechanism such that continued movement of the mechanism will bring it into alignment beneath the chute 160 at the same time as the pear which has been discharged by the now moving conveyor 22 slides down the chute and into the mechanism. In this regard the tab must be of a sufficient width to continue to break the beam of the electric eye 164 until the largest pear resting on the conveyor 22 would be carried out of the beam of the electric eye 150 so that the pear is detected only once. If desired a time delay (not shown) could be added to keep the contacts R2–1 from reclosing before the largest pear would be out of the beam to assure its single detection.

By providing the electric eye units for stopping the conveyor when a pear has reached the transfer station and by restarting the conveyor to discharge the pear into the chute and into the receiving receptacle in properly timed relation thereto, an inexpensive and unique arrangement is provided to assure a singulated transfer of only one pear to each individual orienting mechanism. This transfer is solely dependent upon the position of the receiving receptacle.

While the preferred apparatus for carrying out the invention has been shown and described it will be understood that it is capable of modification and variation while still employing the principles of the invention. It is to be understood, therefore, that the scope of the invention should be limited only by the scope and proper interpretation of the claims appended thereto.

Having thus described the invention, that which is believed to be new and for which protection by Letters Patent is desired is:

1. A single article feeding mechanism comprising conveying means for separating a random supply of articles into a single row of spaced articles, said conveying means including a series of overlapping conveyor belts at least two of which operate at different speeds, means responsive to the movement of an article on said conveyors into a transfer station for stopping said conveyor belts, a single article transfer mechanism including three spaced hook shaped fingers rotatably mounted in timed relationship with a receiving device, and means on said transfer mechanism for restarting said conveyors after said article has been moved out of said transfer station.

2. A single article feeding mechanism comprising a plurality of overlapping conveyor belts, a single article transfer mechanism mounted at the discharge end of said conveyor belts, said conveyor belts operating at different speeds for separating a random supply of articles into a single spaced row, stop means mounted adjacent the discharge end of said conveyor belts at a transfer station to be engaged by an article and for stopping said belts, said single article transfer mechanism including three spaced hooked fingers rotating in timed relationship with an article receiving means, whereby said fingers receive an article and deliver it to the article receiving means in properly timed sequence, and means carried by said transfer mechanism to restart said conveyor belts so that another spaced article is presented to the transfer mechanism and thus repeat the cycle.

3. A single article feeder for advancing randomly received articles in a single row along a predetermined path and into a transfer station while increasing the spacing of the articles from each other, said feeder comprising conveying means, a drive shaft for said conveying means adjacent said transfer station, a rotary transfer mechanism, article carrying means included in said transfer mechanism and movable through said transfer station to engage and carry an article out of said transfer station, means for driving said rotary transfer mechanism at a constant speed, second drive means for driving said conveying means, a clutch included in said second drive means and normally maintained in driving engagement, means for disengaging said clutch for discontinuing the drive to said conveying means and stopping said conveying means, and a detecting finger operatively connected to said clutch disengaging means and responsive to the movement of an article into said transfer station to disengage said clutch and stop said conveyor until said article carrying means of said continuously rotating transfer mechanism removes the article from said conveying means.

4. A single article feeder comprising a slow speed conveyor, an intermediate speed conveyor having one end thereof mounted for rotation about an axis common to both said conveyors, a high speed conveyor having a discharge end and having its other end mounted for rotation about an axis common to both said intermediate speed conveyor and said high speed conveyor, means for drivingly interconnecting said conveyors, means forming a transfer station at the discharge end of said high speed conveyor, a rotary transfer mechanism having a plurality of pick-up fingers movable through said transfer station, means for continuously driving said transfer mechanism at a predetermined speed, a conveyor drive shaft for supporting the discharge end of said high speed conveyor, a drive train including a slip clutch connected between said rotary transfer mechanism and said drive shaft, said slip clutch being normally adapted to provide a driving connection between said transfer mechanism and said drive shaft, a rock shaft journalled for movement adjacent said discharge end of said high speed conveyor, an article detecting finger secured to said rock shaft and disposed in position to be engaged by the foremost article on said high speed conveyor whereby said rock shaft is pivoted between an inactive position and an active conveyor stopping position, a pawl keyed to said rock shaft, a notched wheel keyed on said conveyor drive shaft in position to be engaged by said pawl when said pawl is pivoted to the active conveyor stopping position wherein said pawl locks said notched wheel and conveyor drive shaft in fixed position until after said foremost article is lifted from said high speed conveyor, and cam means carried by said rotary transfer mechanism for shifting said detecting finger from the active to the inactive position after said foremost article has been lifted from the high speed conveyor for causing said friction clutch to again drive said conveyors to advance another article into said transfer station.

5. In combination, means for receiving articles randomly, means for simultaneously advancing the articles in a single file along a path while moving the foremost article to a position spaced forwardly from the next succeeding article, means forming a transfer station at the discharge end of said advancing means, means for stopping said advancing means when the foremost article reaches said transfer station, a processing machine adjacent said transfer station and having article receptacles movable in a path past said station, means for transferring the article and for restarting said advancing means in response to a receptacle reaching a predetermined position along said path past said transfer station wherein each succeeding article is singly transferred to said receptacles in timed relation with the movement of said receptacles past said transfer station.

6. The combination defined by claim 5 wherein said means for transferring the article and for restarting said advancing means includes a shaft having a set of hook-shaped fingers and a cam lug.

7. The combination defined by claim 5 wherein said means for transferring the article and for restarting said advancing means includes an electro-mechanical system.

8. A single article feeder comprising a slow speed conveyor, an intermediate speed conveyor having one end thereof mounted for rotation about an axis common to both said conveyors, a high-speed conveyor having a discharge end and having its other end mounted for rotation about an axis common to both said intermediate speed conveyor and said high speed conveyor, means for drivingly interconnecting said conveyors, an article processing machine adjacent said high speed conveyor and having article receptacles movable in a path past the discharge end of said conveyor, means for continuously driving said processing machine, a conveyor drive shaft for supporting the discharge end of said high speed conveyor, a drive train including a slip clutch connected between said processing machine and said drive shaft, said slip clutch being normally adapted to provide a driving connection between said processing machine and said drive shaft, means for stopping said conveyors upon the arrival of an article at the discharge end of said high speed conveyor, means for restarting said conveyors upon the arrival of an article receptacle at a predetermined position approaching said discharge end of said high speed conveyor whereby the article at the discharge end of said high speed conveyor is discharged therefrom into said approaching receptacle and the next succeeding article is moved to the discharge end of said high speed conveyor.

9. A single article feeder comprising an endless belt conveyor having article receiving and delivery pulleys and shaft assemblies, means for driving said delivery assembly including a normally engaged slip clutch, a single article transfer mechanism at a transfer station adjacent the discharge end of said conveying means for individually removing articles from the conveyor, article engaging stop means on said conveying means adapted to be engaged by the foremost article entering said transfer station, clutch override means interconnecting said stop means and said driven element of said slip clutch and operated by said stop means to stop said conveying means until said transfer mechanism removes the foremost article from said conveying means, and means for releasing said clutch override means and restarting the conveyors automatically in response to continued movement of said transfer mechanism.

10. A single article feeding mechanism comprising means for delivering a random supply of articles, conveying means for singulating said articles, means forming a transfer station at the discharge end of said conveying means, said conveying means including a series of overlapping belt conveyors at least two of which operate at different speeds, means responsive to the movement of an article on the delivery conveyor and into said transfer station for stopping said belt conveyors, said delivery belt conveyor comprising axially spaced belts, a single article transfer mechanism at said transfer station including spaced hook-shaped fingers rotatably mounted for motion between said axially spaced belts, means for turning said fingers in timed relationship with an article receiving device, and means at said transfer station for restarting said conveyors after each article has been moved out of said transfer station.

11. In combination, means for receiving articles randomly, means for simultaneously advancing said articles in a single file formation along a predetermined path while moving the foremost article to a position spaced forwardly from the next succeeding article, means forming a transfer station at the discharge end of said advancing means, means for stopping said advancing means when the foremost article reaches said transfer station, a processing machine adjacent said transfer station and having article receptacles movable in a generally horizontal plane past said station, a stationary gravity chute for conducting articles from said transfer station to an adjacent receptacle, said chute having an article receiving mouth disposed above the discharge end of said advancing means, and means driven in timed relation with said processing machine for lifting the foremost articles of said single file formation from said transfer station and depositing them in said chute while said advancing means is stopped.

12. A conveyor system of the type having article feeder means, at least two continuous conveyors including a primary article receiving conveyor, a secondary article delivery conveyor driven at a different speed and means for removing articles singly from the secondary conveyor; the improvement wherein said article feeder means is a chute device for supplying articles to said primary conveyor at random, said primary and secondary conveyors comprising overlapping endless belt and pulley conveyors cooperating to form the bottom of a trough, the overlapping ends of said conveyors comprising primary and secondary conveyor pulleys on a single shaft, said secondary conveyor comprising axially spaced belt and pulley assemblies, said pulleys being mounted for independent rotation, the article receiving and delivery ends of said primary and secondary conveyors, respectively, comprising pulleys and shafts, the walls of said trough being formed by guide members extending along each side of and above the upper reach of said conveyor belts, said article removing means comprising turnable fingers mounted for moving up between the spaced belts.

13. The system of claim 12, wherein said turnable fingers are L-shaped and are mounted on a shaft that is above the shaft at the delivery end of said secondary conveyor.

References Cited

UNITED STATES PATENTS

| | | | |
|---|---|---|---|
| 1,901,928 | 3/1933 | Olson | 198—21 |
| 3,024,890 | 3/1962 | Belk | 198—34 |
| 3,056,483 | 10/1962 | Galloway | 198—34 |
| 3,093,234 | 6/1963 | Janssen | 198—34 |
| 3,224,550 | 12/1965 | Nigrelli | 198—34 |

EVON C. BLUNK, *Primary Examiner.*

RICHARD E. AEGERTER, *Examiner.*